US012781050B2

(12) United States Patent
Yamada et al.

(10) Patent No.: US 12,781,050 B2
(45) Date of Patent: Nov. 3, 2026

(54) CURABLE ORGANOPOLYSILOXANE COMPOSITION AND SEMICONDUCTOR DEVICE

(71) Applicant: Shin-Etsu Chemical Co., Ltd., Tokyo (JP)

(72) Inventors: Kunihiro Yamada, Annaka (JP); Narimi Hosoda, Annaka (JP); Kenichi Tsuji, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 484 days.

(21) Appl. No.: 18/285,897

(22) PCT Filed: Mar. 31, 2022

(86) PCT No.: PCT/JP2022/016564

§ 371 (c)(1),
(2) Date: Oct. 6, 2023

(87) PCT Pub. No.: WO2022/230600

PCT Pub. Date: Nov. 3, 2022

(65) Prior Publication Data

US 2024/0199817 A1 Jun. 20, 2024

(30) Foreign Application Priority Data

Apr. 28, 2021 (JP) ................................ 2021-075503

(51) Int. Cl.

| | |
|---|---|
| ***C08L 83/04*** | (2006.01) |
| ***C08J 7/12*** | (2006.01) |
| ***C08K 3/08*** | (2006.01) |
| ***C08K 3/22*** | (2006.01) |
| ***C08K 5/5415*** | (2006.01) |
| ***C09D 183/04*** | (2006.01) |
| ***C09K 5/14*** | (2006.01) |
| *C08G 77/12* | (2006.01) |
| *C08G 77/20* | (2006.01) |

(52) U.S. Cl.

CPC ................ *C08L 83/04* (2013.01); *C08J 7/12* (2013.01); *C08K 3/08* (2013.01); *C08K 3/22* (2013.01); *C08K 5/5415* (2013.01); *C09D 183/04* (2013.01); *C09K 5/14* (2013.01); *C08G 77/12* (2013.01); *C08G 77/20* (2013.01); *C08K 2003/2227* (2013.01); *C08K 2003/2296* (2013.01); *C08K 2201/005* (2013.01); *C08L 2205/025* (2013.01)

(58) Field of Classification Search

None

See application file for complete search history.

(56) References Cited

U.S. PATENT DOCUMENTS

| | | | |
|---|---|---|---|
| 7,141,273 B2 | 11/2006 | Endo et al. | |
| 8,119,758 B2 | 2/2012 | Sakurai et al. | |
| 8,802,763 B2 | 8/2014 | Yamada et al. | |
| 2005/0084691 A1 | 4/2005 | Endo et al. | |
| 2008/0057325 A1 | 3/2008 | Sakurai et al. | |
| 2013/0087905 A1 | 4/2013 | Yamada et al. | |
| 2018/0030327 A1* | 2/2018 | Zhang | C09K 5/14 |
| 2019/0355885 A1* | 11/2019 | Nishi | B32B 15/08 |
| 2020/0308404 A1 | 10/2020 | Liu et al. | |
| 2020/0354574 A1 | 11/2020 | Wel et al. | |
| 2022/0064381 A1* | 3/2022 | Kenneweg | B29C 39/006 |

FOREIGN PATENT DOCUMENTS

| | | | |
|---|---|---|---|
| CA | 2 343 486 A1 | 4/2002 | |
| EP | 0 696 630 A2 | 2/1996 | |
| EP | 3156457 A1 * | 4/2017 | B32B 27/283 |

(Continued)

OTHER PUBLICATIONS

Gelest online technical library (no date).*

(Continued)

*Primary Examiner* — Marc S Zimmer

(74) *Attorney, Agent, or Firm* — Birch, Stewart, Kolasch & Birch, LLP

(57) ABSTRACT

Provided is a curable organopolysiloxane composition that is in the form of a grease before curing, has an excellent workability and heat dissipation effect, and is capable of being turned into a cured product exhibiting no cracks and voids at the time of curing. The composition contains:

(A) organopolysiloxanes (A-1) and (A-2) each having at least two silicon atom-bonded alkenyl groups per molecule, and exhibiting different viscosities which are 0.01 to 10 Pa·s for (A-1), and 11 to 1,000 Pa·s for (A-2);

(B) an organohydrogenpolysiloxane;

(C) gallium and/or gallium alloy(s) that have melting points of −20 to 70° C.;

(D) a thermally conductive filler;

(E) a platinum group metal catalyst; and (G-1) an organopolysiloxane represented by the following general formula (1), (1)

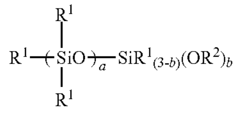

wherein $R^1$s represent alkyl groups, $R^2$ represents an alkyl group, a is an integer of 5 to 100, b is an integer of 1 to 3.

9 Claims, 1 Drawing Sheet

(56) References Cited

FOREIGN PATENT DOCUMENTS

| | | | |
|---|---|---|---|
| EP | 4 095 187 | A1 | 11/2022 |
| JP | 7-207160 | A | 8/1995 |
| JP | 8-53664 | A | 2/1996 |
| JP | 2002-121292 | A | 4/2002 |
| JP | 2005-112961 | A | 4/2005 |
| JP | 2008-56761 | A | 3/2008 |
| JP | 2008-255283 | A | 10/2008 |
| JP | 2010-95730 | A | 4/2010 |
| JP | 4551074 | B2 | 9/2010 |
| JP | 4913874 | B2 | 4/2012 |
| JP | 2013-82816 | A | 5/2013 |
| JP | 5640945 | B2 | 12/2014 |
| JP | 2017-226724 | A | 12/2017 |
| JP | 2019-214640 | A | 12/2019 |

OTHER PUBLICATIONS

Extended European Search Report for European Application No. 22795516.8, dated Mar. 28, 2025.
International Search Report for PCT/JP2022/016564 mailed on Jun. 14, 2022.

* cited by examiner

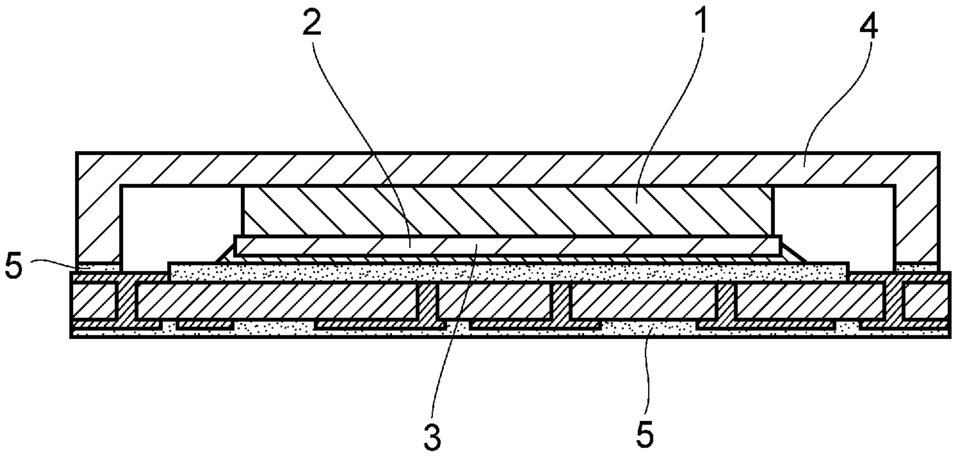
2
1
4
5
3
5

CURABLE ORGANOPOLYSILOXANE COMPOSITION AND SEMICONDUCTOR DEVICE

TECHNICAL FIELD

The present invention relates to a curable organopolysiloxane composition, a method for producing such composition, a cured product of such composition, a use of such cured product as a thermally conductive layer, a semiconductor device having such thermally conductive layer, and a method for producing such semiconductor device.

BACKGROUND ART

A heat-generating electronic part mounted on a printed-wiring board, such as an IC package, e.g., a CPU, may experience deterioration in performance or damage due to a temperature rise caused by heat generated during use. For this reason, heat dissipation has been conducted in such a manner that a thermally conductive sheet with a favorable thermal conductivity or a thermally conductive grease is to be arranged or applied in between an IC package and a heat dissipation fin-equipped heat dissipation member whereby the heat generated from the IC package or the like can be efficiently transferred to the heat dissipation member and dissipated therefrom. However, as electronic parts and the like are becoming more sophisticated, the amount of heat they generate tends to increase even more, which has resulted in a demand to develop a material or member with a thermal conductivity that is even more excellent than those of the conventional ones.

A conventional thermally conductive sheet has an advantage in terms of work and process in that it can be easily mounted and installed. Further, a thermally conductive grease has an advantage in that irrespective of the unevenness of the surfaces of, for example, a CPU and a heat dissipation member, it can conform with such unevenness and allows the two to be adhered to each other without forming a gap(s) therebetween, whereby there can be achieved a small interfacial thermal resistance. However, a thermally conductive sheet and a thermally conductive grease have a disadvantage in that while they are both produced by adding a thermally conductive filler for the purpose of imparting a thermal conductivity, the upper limit of the amount of such thermally conductive filler added is limited and a sufficient thermal conduction effect cannot be achieved accordingly. This is because in the case of a thermally conductive sheet, one has to make sure that a workability and a processibility during a production process thereof will not be impaired; and in the case of a thermally conductive grease, it is required that the upper limit of an apparent viscosity of the grease be limited to a certain level so that there will be no problem in workability when using a syringe or the like to apply the same to a heat-generating electronic part or the like.

In this regard, there have been proposed, for example, methods of adding a low-melting-point metal into a thermally conductive paste (Patent document 1: JP-A-Hei 7-207160, Patent document 2: JP-A-Hei 8-53664); and a granular material for immobilizing and stabilizing a liquid metal in a three-phase composite (Patent document 3: JP-A-2002-121292). However, these thermally conductive materials using low-melting-point metals have a problem(s) of, for example, contaminating parts other than coated parts, and letting an oily matter leak out if used for a long period of time. In order to solve these problems, there has been proposed a method of dispersing gallium and/or a gallium alloy in a curable silicone (Patent document 4: Japanese Patent No. 4551074); however, with this method, a large thickness of a composition has led to an unsatisfactory outcome due to a low thermal conductivity. Further, there have been proposed methods of raising such thermal conductivity (Patent document 5: Japanese Patent No. 4913874, and Patent document 6: Japanese Patent No. 5640945); however, with these methods, satisfactory performances could not be exhibited as cracks and voids were likely to occur at the time of curing.

PRIOR ART DOCUMENTS

Patent Documents

Patent document 1: JP-A-Hei 7-207160
Patent document 2: JP-A-Hei 8-53664
Patent document 3: JP-A-2002-121292
Patent document 4: Japanese Patent No. 4551074
Patent document 5: Japanese Patent No. 4913874
Patent document 6: Japanese Patent No. 5640945

SUMMARY OF THE INVENTION

Problems to be Solved by the Invention

Thus, it is an object of the present invention to obtain a curable organopolysiloxane composition in which a material superior in thermal conduction property is contained in a necessary and sufficient amount and is uniformly dispersed in a matrix composed of resin components in the form of fine particles, and in which the composition itself can be turned into a cured product exhibiting no cracks and voids at the time of curing. Further, it is also an object of the present invention to provide a method for producing such curable organopolysiloxane composition.

Moreover, another object of the present invention is to provide a use of such curable organopolysiloxane composition as a thermally conductive layer composed of a cross-linked cured product of the composition that is obtained by, as is the case with a conventional thermally conductive grease, placing and sandwiching the composition in between a heat-generating electronic part and a heat dissipation member, allowing the composition to conform with the unevenness of the surface of the part or member without forming a gap(s), and then performing a heating treatment. In addition, it is yet another object of the present invention to provide a semiconductor device with an excellent heat dissipation performance, in which a heat-generating electronic part and a heat dissipation member are bonded together via the thermally conductive layer; and a method for producing such semiconductor device.

Means to Solve the Problems

As a result of diligently conducting a series of studies to overcome the above problems, the inventors of the present invention made the following findings. That is, by using two kinds of alkenyl group-containing organopolysiloxanes with different viscosities, and by adding gallium and/or an alloy thereof that have low melting points, a particular alkoxypolysiloxane, a particular silicon atom-bonded organohydrogenpolysiloxane, and a thermally conductive filler, there could be easily obtained a composition with the gallium and/or alloy thereof being uniformly dispersed therein in the form of fine particles, where in a step of turning the composition into a cured product via a heating treatment, cracks and voids were less likely to occur, and liquid particles with large particle sizes were formed as the liquid gallium and/or alloy thereof agglutinated themselves, in which these liquid particles themselves were further combined with the thermally conductive filler to form a kind of continuous path. Another finding in this regard was that the path-like structure was immobilized and retained in the crosslinked network body formed by curing the resin components.

Next, the present invention was made based on findings that by placing and sandwiching the cured product obtained as above in between a heat-generating electronic part and a heat dissipation member in a layer-wise manner, the cured product could be used as a thermally conductive layer with a low thermal resistance, and there could thus be produced a semiconductor product superior in heat dissipation property in which the heat generated by the heat-generating electronic part during operation was able to be quickly transferred to the heat dissipation member through such thermally conductive layer containing the gallium and/or alloy thereof that were immobilized and retained in the above structure.

Specifically, the present invention is to provide the following curable organopolysiloxane composition and a semiconductor device using such curable organopolysiloxane composition.

<1>

A curable organopolysiloxane composition comprising:

(A) 100 parts by mass of an organopolysiloxane that is composed of the following (A-1) and (A-2), and in which a ratio of (A-1) to a sum of (A-1) and (A-2) is 10 to 90% by mass, (A-1) an organopolysiloxane that has at least two silicon atom-bonded alkenyl groups per molecule, and has a viscosity of 0.01 to 10 Pa·s at 25° C., (A-2) an organopolysiloxane that has at least two silicon atom-bonded alkenyl groups per molecule, and has a viscosity of 11 to 1,000 Pa·s at 25° C.;

(B) an organohydrogenpolysiloxane that has at least two silicon atom-bonded hydrogen atoms per molecule, and is in an amount at which the number of the silicon atom-bonded hydrogen atoms in the component (B) is 0.1 to 5.0 per 1 alkenyl group in the component (A);

(C) 300 to 20,000 parts by mass of at least one selected from the group consisting of gallium and gallium alloys that have melting points of −20 to 70° C.;

(D) 10 to 1,000 parts by mass of a thermally conductive filler having an average particle size of 0.1 to 100 μm;

(E) a platinum group metal catalyst that is in an amount of 0.1 to 500 ppm in terms of the mass of the platinum group metal with respect to the mass of the component (A); and (G-1) 10 to 500 parts by mass of an organopolysiloxane represented by the following general formula (1),

[Chemical formula 1]

(1)

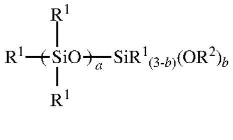

wherein $R^1$s represent identical or different alkyl groups, $R^2$ represents an alkyl group, a is an integer of 5 to 100, b is an integer of 1 to 3.

<2>

The curable organopolysiloxane composition according to <1>, wherein the composition further comprises:

(G-2) an alkoxysilane compound that is represented by the following general formula (2), and is in an amount of 0.1 to 100 parts by mass per 100 parts by mass of the component (A), $$R^3{}_cR^4_d\mathrm{Si}(\mathrm{OR}^5)_{4-c-d} \qquad (2)$$

wherein $R^3$ independently represents an alkyl group having 6 to 16 carbon atoms, $R^4$ independently represents a substituted or unsubstituted monovalent hydrocarbon group having 1 to 8 carbon atoms, $R^5$ independently represents an alkyl group having 1 to 6 carbon atoms, c is an integer of 1 to 3, d is an integer of 0 to 2, and a sum of c+d is an integer of 1 to 3.

<3>

The curable organopolysiloxane composition according to <1> or <2>, wherein the composition further comprises:

(G-3) trifluoropropyltrimethoxysilane that is in an amount of 0.1 to 100 parts by mass per 100 parts by mass of the component (A).

<4>

The curable organopolysiloxane composition according to any one of <1> to <3>, wherein the component (B) is an organohydrogenpolysiloxane that has 5 or more silicon atom-bonded hydrogen atoms at non-terminal moieties of the molecular chain per molecule, and satisfies the flowing formula (3).

$$0.1 < \alpha/\beta \qquad (3)$$

wherein α represents the number of the hydrogen atoms bonded to the silicon atoms at the non-terminal moieties of the molecular chain; β represents the number of all the silicon atoms in the component (B).

<5>

The curable organopolysiloxane composition according to any one of <1> to <4>, wherein the component (C) is dispersed in the composition in the form of particles of a size of 1 to 200 μm.

<6>

A thermally conductive silicone grease composition comprising the curable organopolysiloxane composition according to any one of <1> to <5>.

<7>

A cured product of the curable organopolysiloxane composition according to any one of <1> to <5>.

<8>

A use of the cured product according to <7> as a thermally conductive layer that is sandwiched and arranged between a heat-generating electronic part and a heat dissipation member.

<9>

A semiconductor device comprising:

a heat-generating electronic part;

a heat dissipation member; and a thermally conductive layer composed of the cured product according to <7>, wherein the heat-generating electronic part and the heat dissipation member are bonded via the thermally conductive layer.

<10>

A method for producing the semiconductor device according to <9>, comprising:

(a) a step of applying the curable organopolysiloxane composition according to any one of claims 1 to 5 to a surface of a heat-generating electronic part to form thereon a coating layer composed of the composition;

(b) a step of press-bonding and fixing a heat dissipation member to the coating layer; and (c) a step of heating a structural body obtained after the step (b) at 80 to 180° C. to cure and turn the coating layer into a thermally conductive layer.

Effects of the Invention

Since the curable organopolysiloxane composition of the present invention is in the form of a grease before curing, it has a favorable workability when used to coat a heat-generating electronic part such as a CPU. Further, in this regard, when press-bonding a heat dissipation member, the composition will conform with the unevenness of the surfaces of the two and allow them to be adhered to each other without forming a gap(s) therebetween, thereby incurring no interfacial thermal resistance.

In addition, in the heating treatment step of curing the resin components via addition reaction, cracks and voids are less likely to occur, the gallium and/or alloy thereof contained in the composition of the present invention will agglutinate to form liquid particles with large particle sizes, these liquid particles will be combined with one another and even combined with the thermally conductive filler to form a kind of path, and the path-like structure thus established will be immobilized and retained in a three-dimensional crosslinked network body formed as the result of curing the resin components. For these reasons, the heat generated from a heat-generating electronic part can be quickly transferred to a heat dissipation member, whereby a high heat dissipation effect can be exerted more reliably than a conventional thermally conductive sheet or thermally conductive grease. Further, since the path-forming gallium and/or alloy thereof contained in the thermally conductive layer that is composed of the cured product of the composition of the present invention and is provided in the semiconductor device are immobilized and retained in the three-dimensional crosslinked network body of the cured resin, other parts will not be contaminated, and an oily matter will not leak out over time, which were otherwise problems in the cases of the conventional thermally conductive greases. Thus, the reliability of a semiconductor device can be further improved.

BRIEF DESCRIPTION OF THE DRAWINGS

FIG. 1 is a longitudinal cross-sectional schematic view showing one example of a semiconductor device employing the composition of the present invention.

MODE FOR CARRYING OUT THE INVENTION

Curable Organopolysiloxane Composition

<(A) Organopolysiloxane>

A component (A) of a composition of the present invention is an organopolysiloxane that has at least two silicon atom-bonded alkenyl groups per molecule, and is the main agent (base polymer) in an addition reaction curing system of the present invention. The component (A) is composed of the following (A-1) and (A-2).

(A-1) Organopolysiloxane that has at least two silicon atom-bonded alkenyl groups per molecule, and has a viscosity of 0.01 to 10 Pa·s at 25° C.

(A-2) Organopolysiloxane that has at least two silicon atom-bonded alkenyl groups per molecule, and has a viscosity of 11 to 1,000 Pa·s at 25° C.

The viscosity of (A-1) is preferably 0.1 to 5 Pa·s, more preferably 0.1 to 1 Pa·s. When the viscosity of (A-1) is lower than 0.01 Pa·s, a cured product will become brittle so that cracks are more likely to occur; when the viscosity of (A-1) is higher than 10 Pa·s, the cured product will become soft so that voids are more likely to occur.

The viscosity of (A-2) is preferably 15 to 500 Pa·s, more preferably 20 to 100 Pa·s. When the viscosity of (A-2) is lower than 11 Pa·s, it will be difficult for the composition to be turned into a grease-like product as the ingredients will not be stirred and sheared at the time of production; when the viscosity of (A-2) is higher than 1,000 Pa·s, it will be difficult to handle the composition due to its excessively increased viscosity.

Here, in the present invention, viscosity is a value measured by a spiral viscometer PC-1TL (by Malcom Co., Ltd.) at 25° C.

A ratio of (A-1) to a sum of (A-1) and (A-2) is 10 to 90% by mass, preferably 20 to 80% by mass, more preferably 30 to 70% by mass.

When the ratio of (A-1) is smaller than 10% by mass, the cured product will become soft so that voids are more likely to occur at the time of curing; when the ratio of (A-1) is larger than 90% by mass, it will be difficult for the composition to be turned into a grease-like product as the ingredients will not be stirred and sheared at the time of production.

The molecular structures of the organopolysiloxanes (A-1) and (A-2) are not limited; there may be listed, for example, a linear, a branched, and a partially branched linear structure, of which a linear structure is particularly preferred.

In each of (A-1) and (A-2), the number of the silicon atom-bonded alkenyl groups per molecule may be 2 or more, preferably 2 to 10, more preferably 2 to 5.

The silicon atom-bonded alkenyl group may, for example, be a vinyl group, allyl group, 1-butenyl group, or 1-hexenyl group. Even among these groups, a vinyl group is preferred due to its high versatility. This alkenyl group may be bonded to either the silicon atom at the molecular chain terminal or the silicon atom in the midway of the molecular chain; in order to improve the flexibility of the resulting cured product, it is preferred that such alkenyl group exist by being only bonded to the silicon atom at the molecular chain terminal.

A silicon atom-bonded group other than an alkenyl group may, for example, be a substituted or unsubstituted monovalent hydrocarbon group. Examples of such hydrocarbon group include an alkyl group such as a methyl group, an ethyl group, a propyl group, a butyl group, a pentyl group, a hexyl group, a heptyl group, an octyl group, a nonyl group, a decyl group, and a dodecyl group; a cycloalkyl group such as a cyclopentyl group and a cyclohexyl group; an aryl group such as a phenyl group, a tolyl group, a xylyl group, and a naphthyl group; an aralkyl group such as a benzyl group, 2-phenylethyl group, and 2-phenylpropyl group; and a halogenated alkyl group such as a chloromethyl group, 3,3,3-trifluoropropyl group, and 3-chloropropyl group.

In terms of synthesis and economic efficiency, it is preferred that 90% or more of them are methyl groups.

Specific and preferable examples of such organopolysiloxane include a polydimethylsiloxane with both molecular chain terminals being blocked by dimethylvinylsiloxy groups, a polydimethylsiloxane with both molecular chain terminals being blocked by methyldivinylsiloxy groups, and a dimethylsiloxane-methylphenylsiloxane copolymer with both molecular chain terminals being blocked by dimethylvinylsiloxy groups.

<(B) Organohydrogenpolysiloxane>

A component (B) of the composition of the present invention is an organohydrogenpolysiloxane that has at least two silicon atom-bonded hydrogen atoms (hereinafter referred to as "Si—H groups") per molecule, and acts as a cross-linking agent for the component (A). That is, due to the function of a later-described platinum-based catalyst as a component (E), these Si—H groups in the component (B) are to be added to the alkenyl groups in the component (A) via a hydrosilylation reaction, whereby there can be obtained a crosslinked cured product having a three-dimensional network structure that contains cross-linking bonds.

The number of the Si—H groups in the component (B) is 2 or more per molecule, preferably 5 or more per molecule in terms of suppressing voids at the time of curing, even more preferably 10 or more per molecule. Further, it is more preferred that the component (B) be an organohydrogenpolysiloxane that has 5 or more silicon atom-bonded hydrogen atoms at non-terminal moieties of the molecular chain per molecule, and satisfies the flowing formula (3).

$$0.1 < \alpha/\beta \quad (3)$$

(In the formula (3), α represents the number of the hydrogen atoms bonded to the silicon atoms at the non-terminal moieties of the molecular chain; B represents the number of all the silicon atoms in the component (B).)

When α/β is as small as 0.1 or smaller, voids are likely to occur at the time of curing; thus, it is also required that the organohydrogenpolysiloxane satisfy 0.1<α/β. In this case, α/β is preferably not smaller than 0.11, particularly preferably not smaller than 0.12. The upper limit of α/β is not particularly limited; α/β is preferably not larger than 0.95, particularly preferably not larger than 0.90.

The molecular structure of the component (B) is not particularly limited so long as it meets the above conditions; the molecular structure thereof may be any of conventionally known structures such as a linear structure, a cyclic structure, a branched structure, and a three-dimensional network (resin) structure. The number of the silicon atoms per molecule (or polymerization degree) is normally 3 to 1,000, preferably 5 to 400, more preferably 10 to 300, even more preferably 10 to 100, particularly preferably 10 to 60.

The kinetic viscosity of the organohydrogenpolysiloxane as the component (B) is normally 1 to 10,000 $mm^2/s$, preferably 3 to 5,000 $mm^2/s$, more preferably 5 to 3,000 $mm^2/s$; it is preferred that the organohydrogenpolysiloxane as the component (B) be liquid at room temperature (25° C.). Here, this kinetic viscosity is a value measured by an Ostwald viscometer at 25° C.

As an organohydrogenpolysiloxane that meets the above conditions, preferred is, for example, one represented by the following average composition formula (4).

$$R^6{}_eH_fSiO_{(4-e-f)/2} \quad (4)$$

(In the formula (4), $R^6$ represents an aliphatic unsaturated bond-free substituted or unsubstituted monovalent hydrocarbon group, e is a number of 0.7 to 2.2, f is a number of 0.001 to 0.5, provided that e+f is a number satisfying 0.8 to 2.5.)

In the formula (4), $R^6$ is normally an aliphatic unsaturated bond-free substituted or unsubstituted monovalent hydrocarbon group having 1 to 10, preferably 1 to 6 carbon atoms. Specific examples of such hydrocarbon group include an alkyl group such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; an aryl group such as a phenyl group, a tolyl group, a xylyl group, and a naphthyl group; an aralkyl group such as a benzyl group, a phenylethyl group, and a phenylpropyl group; and groups obtained by substituting part of or all the hydrogen atoms in any of these groups with halogen atoms such as fluorine atoms and chlorine atoms, as exemplified by 3,3,3-trifluoropropyl group. Preferred are an alkyl group, an aryl group, and 3,3,3-trifluoropropyl group; more preferred are a methyl group, a phenyl group, and 3,3,3-trifluoropropyl group.

In the formula (4), e, f, and e+f are each described as above. It is preferred that e be a number of 0.9 to 2.1; f be a number of 0.002 to 0.2, particularly preferably a number of 0.005 to 0.1; and e+f be a number satisfying 1.0 to 2.3, particularly preferably 1.5 to 2.2.

The molecular structure of the organohydrogenpolysiloxane represented by the formula (4) is not particularly limited; the molecular structure thereof may be any of, for example, a linear structure, a cyclic structure, a branched structure, and a three-dimensional network (resin) structure. Among them, a linear structure is particularly preferred as a structure with which the number of the silicon atoms per molecule and the kinetic viscosity fall into the above ranges.

Specific examples of the organohydrogenpolysiloxane represented by the formula (4) include a dimethylsiloxane-methylhydrogensiloxane copolymer with both molecular chain terminals being blocked by dimethylhydrogensiloxy groups; a methylhydrogensiloxane-dimethylsiloxane-diphenylsiloxane copolymer with both molecular chain terminals being blocked by dimethylhydrogensiloxy groups; a dimethylsiloxane-methylhydrogensiloxane copolymer with one molecular chain terminal being blocked by a dimethylhydrogensiloxy group, and with the other molecular chain terminal being blocked by a trimethylsiloxy group; a methylhydrogensiloxane-dimethylsiloxane-diphenylsiloxane copolymer with one molecular chain terminal being blocked by a dimethylhydrogensiloxy group, and with the other molecular chain terminal being blocked by a trimethylsiloxy group; a copolymer composed of a $(CH_3)_2HSiO_{1/2}$ unit, $(CH_3)_3SiO_{1/2}$ unit, $(CH_3)HSiO_{2/2}$ unit, and $SiO_{4/2}$ unit; a copolymer composed of a $(CH_3)_2HSiO_{1/2}$ unit, $(CH_3)_3SiO_{1/2}$ unit, $(CH_3)HSiO_{2/2}$ unit, $(CH_3)_2SiO_{2/2}$ unit, and $SiO_{4/2}$ unit; a copolymer composed of a $(CH_3)_2HSiO_{1/2}$ unit, $(CH_3)HSiO_{2/2}$ unit, $(CH_3)_2SiO_{2/2}$ unit, and $SiO_{4/2}$ unit; a copolymer composed of a $(CH_3)_2HSiO_{1/2}$ unit, $SiO_{4/2}$ unit, $(CH_3)HSiO_{2/2}$ unit, $(CH_3)_2SiO_{2/2}$ unit, and $(C_6H_5)_3SiO_{1/2}$ unit; and a copolymer composed of a $(CH_3)_2HSiO_{1/2}$ unit, $(CH_3)_3SiO_{1/2}$ unit, $(C_6H_5)_2SiO_{2/2}$ unit, $(CH_3)HSiO_{2/2}$ unit, $(CH_3)_2SiO_{2/2}$ unit, and $SiO_{4/2}$ unit.

The component (B) is added in an amount at which the number of the silicon atom-bonded hydrogen atoms in the component (B) will become 0.1 to 5.0, preferably 0.3 to 3.0, more preferably 0.5 to 2.0, per 1 silicon atom-bonded alkenyl group in the component (A). When such number of the silicon atom-bonded hydrogen atoms is smaller than 0.1, voids are likely to occur at the time of curing due to an extremely low cross-linking density; when such number of the silicon atom-bonded hydrogen atoms is larger than 5.0, a resulting thermally conductive silicone composition will exhibit a poor reliability due to its excessive hardness.

One kind of such organohydrogenpolysiloxane as the component (B) may be used alone, or two or more kinds thereof may be used in combination.

<(C) Gallium and/or Alloy Thereof>

A component (C) of the composition of the present invention is gallium and/or an alloy thereof having a melting point of −20 to 70° C. The component (C) is a component added to impart a favorable thermal conductivity to the cured product obtained from the composition of the present invention, and it is the addition of this component that characterizes the present invention.

As mentioned above, the melting point of the component (C) needs to be in the range of −20 to 70° C. While those having a melting point of −20° C. or lower may also be physically used in the present invention, those having a melting point of lower than 20° C. are hardly available and are thus not preferable in terms of economic efficiency; meanwhile, if the melting point is greater than 70° C., the component will not quickly melt in a preparation process of the composition, which will result in a poor workability. In this way, as described above, an appropriate range of the melting point of the component (C) is the range of −20 to 70° C. Particularly, it is preferred that the melting point be in a range of 19 to 50° C. because the composition of the present invention can be easily prepared.

Metal gallium has a melting point of 29.8° C. Typical examples of a gallium alloy include a gallium-indium alloy, e.g., Ga—In (mass ratio=75.4:24.6, melting point=15.7° C.); a gallium-tin alloy; a gallium-tin-zinc alloy, e.g., Ga—Sn—Zn (mass ratio=82:12:6, melting point=17° C.); a gallium-indium-tin alloy, e.g., Ga—In—Sn (mass ratio=68.5:21.5:10, melting point=−19° C.; mass ratio=62:25:13, melting point=5.0° C.; or mass ratio=21.5:16.0:62.5, melting) point=10.7° C.; and a gallium-indium-bismuth-tin alloy, e.g., Ga—In—Bi—Sn (mass ratio=9.4:47.3:24.7:18.6, melting point 48.0° C.).

One kind of such component (C) may be used alone, or two or more kinds thereof may be used in combination.

The liquid or solid fine particles of gallium and/or the alloy thereof present in the composition of the present invention when the composition is in an uncured state, each have a substantially spherical shape, and amorphous particles may also be contained therein. Further, the average particle size thereof is normally 1 to 200 μm, particularly preferably 5 to 150 μm, more preferably 10 to 100 μm. An excessively small average particle size will lead to an excessively high viscosity of the composition, which will result in a poor extensibility and a problematic coating workability accordingly; meanwhile, an excessively large average particle size will lead to an ununiform composition, which will make it difficult to turn the composition into the shape of a thin film on a heat-generating electronic part or the like via coating. Here, as described above, since the composition is to be immediately stored under a low temperature after its preparation, the aforesaid shape, average particle size, and dispersed state in the composition can be maintained until a coating step of applying the composition to a heat-generating electronic part or the like. Specifically, the average particle size was calculated by conducting observation using VR-3000 manufactured by KEYENCE CORPORATION, with the uncured composition being sandwiched by two pieces of glass slide. That is, 30 particles were randomly selected from an image taken by this measurement device, the particle size of each particle was then measured, and an average value thereof was then calculated.

The component (C) is added in an amount of 300 to 20,000 parts by mass, particularly preferably 2,000 to 15,000 parts by mass, more preferably 3,000 to 12,000 parts by mass, per 100 parts by mass of the component (A). A low thermal conductivity will be resulted if the component (C) is added in an amount of smaller than 300 parts by mass; in such case, if the composition is thick, there may not be achieved a satisfactory heat dissipation performance. If the amount of the component (C) added is larger than 20,000 parts by mass, it will be difficult to obtain a uniform composition, and since the viscosity of the composition will be excessively high in such case, the composition may not be able to be obtained as a grease-like composition having an extensibility.

<(D) Thermally Conductive Filler>

Together with the component (C), a thermally conductive filler (D) (except the component (C)) that is to be added to a conventionally known thermally conductive sheet or thermally conductive grease needs to be added to the composition of the present invention.

This component (D) is not particularly limited so long as it has a favorable thermal conductivity; those that are conventionally known can all be used, examples of which may include an aluminum powder, a zinc oxide powder, an alumina powder, a boron nitride powder, an aluminum nitride powder, a silicon nitride powder, a copper powder, a diamond powder, a nickel powder, a zinc powder, a stainless steel powder, and a carbon powder. Here, one kind of such component (D) may be used alone, or two or more kinds thereof may be used in combination.

Particularly, a zinc oxide powder and an alumina powder are preferred in terms of availability and economic efficiency.

The average particle size of the component (D) is 0.1 to 100 μm, preferably 1 to 20 μm. An excessively small average particle size will lead to an excessively high viscosity of the composition obtained, which will result in a poor extensibility. Meanwhile, an excessively large average particle size will make it difficult to obtain a uniform composition. Here, this average particle size is a volume average size [MV] on volumetric basis that is measured by Microtrac MT3300EX (by Nikkiso Co., Ltd.).

When the component (D) is added in an amount of smaller than 10 parts by mass per 100 parts by mass of the component (A), gallium and/or the alloy thereof will not be uniformly dispersed in the component (A) or a mixture of the component (A) and a later-described component (G); when the component (D) is added in an amount of larger than 1,000 parts by mass per 100 parts by mass of the component (A), there will be a problem that due to an excessively high viscosity of the composition, the composition cannot be obtained as a grease-like composition having an extensibility. Thus, the component (D) is added in an amount of 10 to 1,000 parts by mass, preferably 50 to 500 parts by mass.

<(E) Platinum Group Metal Catalyst>

A platinum group metal catalyst as a component (E) of the composition of the present invention is a component added to promote the addition reaction between the alkenyl groups in the component (A) and the SiH groups in the component (B), and thereby yield a three-dimensionally networked crosslinked cured product from the composition of the present invention.

As such component (E), known ingredients that are used for normal hydrosilylation reactions can all be used, examples of which may include platinum metal (platinum black), chloroplatinic acid, a platinum-olefin complex, a platinum-alcohol complex, and a platinum coordination compound. The amount of the component (E) added is not particularly limited so long as it is an effective amount required to cure the composition of the present invention; for example, it is preferred that the component (E) be normally added in an amount of about 0.1 to 500 ppm in terms of platinum atoms with respect to the mass of the component (A).

<(G-1) Surface Treatment Agent>

A polysiloxane represented by the following general formula (1) is added to the composition of the present invention as a surface treatment agent (G-1); this surface treatment agent (G-1) is added for the purposes of hydrophobizing the gallium and/or alloy thereof as the component (C) at the time of preparing the composition, and improving a wettability of the component (C) to the organopolysiloxane as the component (A) so as to allow the component (C) as fine particles to be uniformly dispersed in a matrix composed of the component (A).

Further, this component (G-1) also has a function of likewise improving a wettability of the surface of the thermally conductive filler as the component (D), and thereby imparting a favorable uniform dispersibility to the filler.

The component (G-1) is a polysiloxane represented by the following general formula (1); one molecular chain terminal of this polysiloxane is blocked by a hydrolyzable group, and the polysiloxane has a kinetic viscosity of 10 to 10,000 $mm^2/s$ at 25° C. Here, this kinetic viscosity is a value measured by an Ostwald viscometer at 25° C.

[Chemical formula 2]

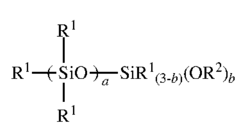

(1)

(In the formula (1), $R^1$s represent identical or different alkyl groups, $R^2$ represents an alkyl group, a is an integer of 5 to 100, b is an integer of 1 to 3.)

Examples of the alkyl group represented by $R^1$ in the general formula (1) include a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group. Among them, a methyl group and an ethyl group are particularly preferred.

Examples of the alkyl group represented by $R^2$ in the general formula (1) include a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group. Among them, a methyl group and an ethyl group are particularly preferred.

It is preferable if the component (G-1) is added in an amount of not smaller than 10 parts by mass per 100 parts by mass of the component (A), because the components (C) and (D) will be satisfactorily dispersed to obtain a uniform grease composition; however, if the component (G-1) is added in an amount of larger than 500 parts by mass per 100 parts by mass of the component (A), there will be a problem that since the component (A) will thus be relatively contained in a smaller amount, the composition obtained will not be cured easily. Without curing, the grease may be misaligned after being applied to a device such as CPU, whereby a significantly deteriorated performance may be observed. Thus, the component (G-1) is added in an amount of 10 to 500 parts by mass, preferably 50 to 300 parts by mass.

<Other Components>

In addition to the above essential components, the curable organopolysiloxane composition of the present invention may further contain the following components as appropriate.

<(F) Addition Reaction Controller>

An addition reaction controller as a component (F) of the composition of the present invention is a component that is added as appropriate, and is a component added to inhibit the hydrosilylation reaction caused by the action of the platinum-based catalyst at room temperature so as to secure a work life (i.e. shelf life, pot life) of the composition of the present invention and thereby pose no obstacles to the operation of applying the composition to a heat-generating electronic part or the like.

As such component (F), known addition reaction controllers that are used in normal addition reaction-curable silicone compositions can all be used, examples of which may include acetylene compounds such as 1-ethynyl-1-cyclohexanol and 3-butyn-1-ol; various nitrogen compounds; organic phosphorus compounds; oxime compounds; and organic chloro compounds.

The amount of the component (F) added varies depending on the amount of the component (E) used, and cannot be categorically determined; the amount of the component (F) is not particularly limited so long as it is an effective amount capable of inhibiting the progression of the hydrosilylation reaction. For example, the component (F) may be normally added in an amount of about 0.001 to 5 parts by mass per 100 parts by mass of the component (A). If the amount of the component (F) added is excessively small, there cannot be secured a sufficient work life; if the amount of the component (F) added is excessively large, the curability of the composition of the present invention will be impaired. Here, in order to improve its dispersibility in the composition, this component (F), if necessary, may also be diluted with an organic solvent such as toluene, xylene, and isopropyl alcohol before use.

Moreover, the composition of the present invention may further contain the following alkoxysilane as a component (G-2).

(G-2) is represented by the following general formula (2):

$$R^3{}_cR^4{}_dSi(OR^5)_{4-c-d} \quad (2)$$

(In the formula (2), $R^3$ independently represents an alkyl group having 6 to 16 carbon atoms, $R^4$ independently represents a substituted or unsubstituted monovalent hydrocarbon group having 1 to 8 carbon atoms, $R^5$ independently represents an alkyl group having 1 to 6 carbon atoms, c is an integer of 1 to 3, d is an integer of 0 to 2, and a sum of c+d is an integer of 1 to 3.)

Examples of $R^3$ in the general formula (2) include a hexyl group, an octyl group, a nonyl group, a decyl group, a dodecyl group, and a tetradecyl group. When the number of the carbon atoms is smaller than 6, improvement in wettability of the components (C) and (D) will be insufficient; when the number of the carbon atoms is greater than 16, the organosilane as the component (G-2) will solidify at normal temperature, which will lead to an inconvenient handling and an impaired low-temperature property of the composition obtained.

Further, examples of $R^4$ in the general formula (2) include an alkyl group such as a methyl group, an ethyl group, a propyl group, a hexyl group and an octyl group; a cycloalkyl group such as a cyclopentyl group and a cyclohexyl group; an alkenyl group such as a vinyl group and an allyl group; an aryl group such as a phenyl group and a tolyl group; an aralkyl group such as 2-phenylethyl group and 2-methyl-2-phenylethyl group; and a halogenated hydrocarbon group such as 3,3,3-trifluoropropyl group, 2-(nanofluorobutyl) ethyl group, 2-(heptadecafluorooctyl)ethyl group, and p-chlorophenyl group. Among them, a methyl group and an ethyl group are particularly preferred.

Moreover, examples of $R^5$ in the general formula (2) include an alkyl group such as a methyl group, an ethyl group, a propyl group, a butyl group, a pentyl group, and a hexyl group. Among them, a methyl group and an ethyl group are particularly preferred.

Preferable and specific examples of the component (G-2) are as follows.

$C_6H_{13}Si(OCH_3)_3$ $C_{10}H_{21}Si(OCH_3)_3$ $C_{12}H_{25}Si(OCH_3)_3$ $C_{12}H_{25}Si(OC_2H_5)_3$ $C_{10}H_{21}(CH_3)Si(OCH_3)_2$ $C_{10}H_{21}(C_6H_5)Si(OCH_3)_2$ $C_{10}H_{21}(CH_3)Si(OC_2H_5)_2$ $C_{10}H_{21}(CH{=}CH_2)Si(OCH_3)_2$

Here, one kind of such component (G-2) may be used alone, or two or more kinds thereof may be used in combination. Further, when the component (G-2) is added in an amount of not smaller than 0.1 parts by mass per 100 parts by mass of the component (A), the viscosity of the composition is likely to fall into a desired range; when the component (G-2) is added in an amount of larger than 100 parts by mass per 100 parts by mass of the component (A), the wetter effect will not intensify, and an economic inefficiency will thus be incurred. In this way, a range of 0.1 to 100 parts by mass is preferable. A range of 1 to 50 parts by mass is more preferable.

Moreover, the composition of the present invention may further contain trifluoropropyltrimethoxysilane as a component (G-3) in some cases. Further, when the component (G-3) is added in an amount of not smaller than 0.1 parts by mass per 100 parts by mass of the component (A), the viscosity of the composition is likely to fall into a desired range; when the component (G-3) is added in an amount of larger than 100 parts by mass per 100 parts by mass of the component (A), the wetter effect will not intensify, and an economic inefficiency will thus be incurred. In this way, a range of 0.1 to 100 parts by mass is preferable. A range of 1 to 50 parts by mass is more preferable.

Here, the components (G-1), (G-2) and (G-3) may each be used alone, or they may be used in a combined manner.

<Optional Components Other than those Listed Above>

The composition of the present invention may also contain an organopolysiloxane represented by the following average composition formula (5) to the extent that the purposes and effects of the present invention are not impaired.

It is an organopolysiloxane that is represented by the following average composition formula (5), and has a kinetic viscosity of 10 to 100,000 $mm^2/s$ at 25° C.; one kind thereof may be used alone, or two or more kinds thereof may be used in combination.

Average Composition Formula (5):

$$R^7_g SiO_{(4-g)/2} \tag{5}$$

(In the formula (5), $R^7$ independently represents an aliphatic unsaturated bond-free substituted or unsubstituted monovalent hydrocarbon group having 1 to 18 carbon atoms, and g is a number of 1.8 to 2.2.)

$R^7$ independently represents a substituted or unsubstituted monovalent hydrocarbon group having 1 to 18 carbon atoms. Examples of $R^7$ include an alkyl group such as a methyl group, an ethyl group, a propyl group, a hexyl group, an octyl group, a decyl group, a dodecyl group, a tetradecyl group, a hexadecyl group, and an octadecyl group; a cyclohexyl group such as a cyclopentyl group and a cyclohexyl group; an alkenyl group such as a vinyl group and an allyl group; an aryl group such as a phenyl group and a tolyl group; an aralkyl group such as 2-phenylethyl group and 2-methyl-2-phenylethyl group; and a halogenated hydrocarbon group such as 3,3,3-trifluoropropyl group, 2-(perfluorobutyl)ethyl group, 2-(perfluorooctyl)ethyl group, and p-chlorophenyl group.

The composition of the present invention may further contain, for example, a heat resistance improver such as iron oxide and cerium oxide; a viscosity modifier such as silica; and a colorant.

<Viscosity of Composition>

As described later, the composition of the present invention is applied to the surface of a heat-generating electronic part, and a heat dissipation member is then press-bonded thereto, followed by performing a heating treatment to cure the composition so as to form a thermally conductive layer. At that time, for the sake of a favorable workability, the composition of the present invention needs to be in the form of a grease.

For example, the composition of the present invention is stored in a syringe, a coating layer is then formed by applying the composition from this syringe to the surface of a heat-generating electronic part such as a CPU, and a heat dissipation member is later press-bonded thereto. Thus, the viscosity of the composition of the present invention is normally 10 to 1,000 Pa·s, particularly preferably 30 to 400 Pa·s. An excessively low viscosity will lead to dripping at the time of coating, which may cause problems in workability. Meanwhile, an excessively high viscosity will make it difficult for the composition to be pushed out from the syringe, which may lead to a poor work efficiency when performing coating. Here, this viscosity is a value measured by the spiral viscometer PC-1TL (by Malcom Co., Ltd.) at 25° C.

Preparation of Composition of the Invention

While the curable organopolysiloxane composition of the present invention can be produced by a production method having the following steps, the production method shall not be limited to the following descriptions. The production method has:

(i) a step of obtaining a uniform mixture (i) by kneading the components (A), (C), (D) and (G-1) as well as (G-2) and (G-3), if the components (G-2) and (G-3) are to be contained, at a temperature that is within a range of 20 to 120° C. and is not lower than the melting point of the component (C);

(ii) a step of obtaining a mixture (ii) by stopping kneading the mixture (i) and cooling the mixture (i) to a temperature lower than the melting point of the component (C); and (iii) a step of obtaining a uniform mixture (iii) by adding to the mixture (ii) the components (B) and (E) as well as the component (F) and other components, if the component (F) and such other components are to be contained, and then performing kneading at a temperature lower than the melting point of the component (C).

In this production method, there is used a stirring and kneading machine such as a conditioning mixer or planetary mixer equipped with a heating unit and even a cooling unit if necessary.

In the step (i), a liquid substance of the gallium and/or alloy thereof as the component (C), and the thermally conductive filler as the component (D) are to be uniformly dispersed into a mixed liquid prepared by combining the component (A), the component (G-1), and at least one of the components (G-2) and (G-3).

It is preferred that a temperature lowering operation or cooling operation be carried out swiftly in the step (ii). In the step (ii), as for the component (C) which is in the state of liquid or solid fine particles uniformly dispersed in a matrix composed of the mixed liquid prepared by combining the component (A), the component (G-1), and at least one of the components (G-2) and (G-3), the average particle size and dispersed state thereof are retained.

It is preferred that the step (iii) also be finished in a short period of time as much as possible. At a time when the step (iii) is finished, there occurs no substantive change in the dispersed state of the fine particles of the component (C). Next, after finishing the step (iii), the composition produced will be received in a container, and preferably be quickly stored in, for example, a freezer or refrigerator of a temperature of about −30 to −10° C., preferably −25 to −15° C. Further, even for its transportation or the like, it is preferable to use, for example, a vehicle having a refrigeration equipment. By storing and transporting the composition of the present invention under a low temperature in such manner, the composition and dispersed state thereof can be stably retained even when stored for a long period of time, for example.

Application to Semiconductor Device

If curing the composition of the present invention, the composition can be cured by being held at a temperature of 80 to 180° C. for about 30 to 240 min.

When interposed between a heat-generating electronic part and a heat dissipation member, the cured product of the composition of the present invention can be used as a thermally conductive cured product for forming a thermally conductive layer.

In such case, using the composition of the present invention, there can be obtained a semiconductor device superior in heat dissipation property, i.e., a semiconductor device having a heat-generating electronic part, a heat dissipation member, and a thermally conductive layer composed of the cured product of the composition of the present invention, in which the heat-generating electronic part and the heat dissipation member are bonded via the thermally conductive layer.

The semiconductor device can be produced by a production method having:

(a) a step of applying the composition of the present invention to a surface of a heat-generating electronic part to form thereon a coating layer composed of the composition;

(b) a step of press-bonding and fixing a heat dissipation member to the coating layer; and (c) a step of heating a structural body obtained after the step (b) at 80 to 180° C. to cure and turn the coating layer into a thermally conductive layer.

The semiconductor device and the production method thereof are described with reference to FIG. 1. Here, the device shown in FIG. 1 is merely one example of an application of the composition of the present invention to a semiconductor device; the semiconductor device of the present invention shall not be limited to the device shown in FIG. 1.

In the beginning, the composition of the present invention that is in a frozen and stored state is to be naturally defrosted and turned into a grease-like substance by being left under room temperature. Next, the liquid composition of the present invention is put into a coating tool such as a syringe.

The composition of the present invention is then applied (dispensed) from the syringe or the like to the surface of a heat-generating electronic part, e.g, a CPU2 as a heat-generating electronic part mounted on a substrate 3 shown in FIG. 1, thereby forming a curable composition layer (coating layer) 1. In addition, an adhesive agent 5 is applied at the same time to fix a heat dissipation member 4, whereby the heat dissipation member 4 is to be fixed thereon by being press-bonded to the CPU2 via the coating layer 1.

There, the thickness of the coating layer 1 sandwiched by the CPU2 and the heat dissipation member 4 is normally adjusted to 5 to 100 μm, particularly preferably 10 to 70 μm. An excessively small thickness will make peeling more likely to occur, which will result in a poor reliability; meanwhile, an excessively large thickness will lead to a large thermal resistance such that a satisfactory heat dissipation effect cannot be achieved.

Next, the device configured in the above manner is placed in a heating device to cure the coating layer 1 composed of the composition of the present invention and thus turn it into a thermally conductive layer 1. The temperature required for this curing process is 80 to 180° C., particularly preferably 100 to 150° C. A temperature of lower than 80° C. may lead to an insufficient curing; meanwhile, a high temperature greater than 180° C. may cause electronic parts and base materials to deteriorate.

During the process of raising the temperature to the temperature required for curing, liquid particles with large particle sizes will be formed as the liquid or solid fine particles of the gallium and/or alloy thereof as the component (C) in the composition of the present invention agglutinate, and at the same, the particles will also be combined with the component (D) to form a kind of continuous path.

Moreover, the liquid particles of the component (C) will also be fused onto the surfaces of the CPU2 and the heat dissipation member 4 that are in contact with the composition. Thus, the CPU2 and the heat dissipation member 4 are substantially rich in an integrally continuous thermal conductivity via the kind of continuous path formed by combining the liquid particles of the component (C) and the thermally conductive filler as the component (D). Further, the path-like structure is immobilized and retained in the three-dimensional crosslinked network body of the cured product formed by the addition reaction between the components (A) and (B).

Further, when operating or using the semiconductor device obtained in the above manner, the surface temperature of a heat-generating electronic part such as CPU is normally as high as about 60 to 120° C. With regard to this heat generation, the thermally conductive layer composed of the cured product of the composition of the present invention exhibits a high thermal conductivity as above, and brings about a significantly superior function and effect of exhibiting a more excellent heat dissipation property as compared to the conventional thermally conductive sheets and thermally conductive greases. In addition, even when the semiconductor device is continuously operated or used for a long period of time, the gallium and/or alloy thereof as the component (C) forming the path contained in the thermally conductive layer will not leak form the thermally conductive layer as the component (C) is immobilized and retained in the three-dimensional crosslinked network body of the cured product.

Further, since this thermally conductive layer has a tackiness, it has a stable flexibility even when the heat dissipation member has been misaligned or the device has been used for a long period of time, thereby preventing the thermally conductive layer from being peeled off from the heat-generating electronic part and the heat dissipation member.

Here, similar effects can be achieved by previously producing a sheet-like cured product with a desired thickness from the composition of the present invention, and then interposing such cured product between a heat-generating electronic part and a heat dissipation member as are the cases with the conventional thermally conductive sheets. Other than that, the sheet or the like of the cured product of the composition of the present invention may also be appropriately used as a part(s) of other devices or the like requiring thermal conductivity and heat resistance.

WORKING EXAMPLES

The present invention is described in greater detail hereunder with reference to working examples; however, the invention shall not be limited to these working examples.

The components (A) to (G) used in the following working and comparative examples are shown below. Here, viscosity is a value measured by a spiral viscometer PC-1TL (by Malcom Co., Ltd.), and kinetic viscosity is a value measured by an Ostwald viscometer.

Component (A):

Dimethylpolysiloxane with both terminals being blocked by dimethylvinylsilyl groups, and whose viscosity at 25° C. is as follows;

(A-1-1) Viscosity: 0.1 Pa·s (A-1-2) Viscosity: 1.0 Pa·s (A-2-1) Viscosity: 30 Pa·s (A-2-2) Viscosity: 100 Pa·s Component (B):

(B-1) Organohydrogenpolysiloxane represented by the following structural formula (α/β=0.35, kinetic viscosity at 25° C. 113 $mm^2/s$)

[Chemical formula 3]

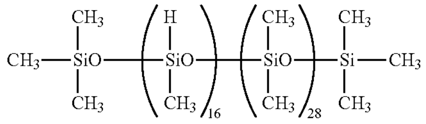

(In this formula, the siloxane units in the parentheses are arranged in arbitrary orders.)

(B-2) Organohydrogenpolysiloxane represented by the following structural formula (α/β=0.29, kinetic viscosity at 25° C.27 $mm^2/s$)

[Chemical formula 4]

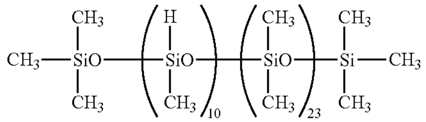

(In this formula, the siloxane units in the parentheses are arranged in arbitrary orders.)

Component (C):

(C-1) Metal gallium [melting point=29.8° C.]

(C-2) Ga—In alloy [mass ratio=75.4:24.6, melting point=15.7° C.]

(C-3) Ga—In—Sn alloy [mass ratio=68.5:21.5:10, melting point=−19° C.]

(C-4) Ga—In—Sn alloy [mass ratio=62:25:13, melting point=5.0° C.]

(C-5) Metal indium [melting point=156.2° C.] <for comparison>

Component (D):

(D-1): Alumina powder [average particle size: 8.2 μm]

(D-2): Zinc oxide powder [average particle size: 1.0 μm]

Component (E):

(E-1): Dimethylpolysiloxane (with both terminals being blocked by dimethylvinylsilyl groups, viscosity: 0.6 Pa·s) solution of platinum-divinyltetramethyldisiloxane complex [platinum atom content: 1% by mass]

Component (F):

(F-1) 1-ethynyl-1-cyclohexanol

Component (G):

(G-1) Dimethylpolysiloxane with one terminal being blocked by a trimethoxysilyl group, that is represented by the following structural formula and has a kinetic viscosity of 32 $mm^2/s$

[Chemical formula 5]

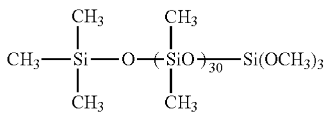

(G-2) Organosilane represented by a structural formula: $C_{10}H_{21}Si(OCH_3)_3$ (G-3) Trifluoropropyltrimethoxysilane Here, in the process of preparing the composition, "component (G)" is a collective expression referring to (G-1), (G-2) and (G-3) used in each example listed in Tables 1 and 2.

Working Examples 1 to 6; Comparative Examples 1 to 5

<Preparation of Composition>

The components were taken at the composition ratios shown in Tables 1 and 2, and the composition was prepared in the following manner.

The components (A), (C), (D) and (G) were added to the container of a conditioning mixer having an inner capacity of 250 mL (product name: Awatori Rentaro by THINKY CORPORATION), where the temperature was raised to and maintained at 70° C., and kneading was performed for 5 min. Next, kneading was stopped, and the mixture was cooled to 15° C.

Subsequently, the components (B), (E) and (F) were added to the mixture of the components (A), (C), (D) and (G), where the components were kneaded at 25° C. until uniform to obtain each composition.

<Viscosity Measurement>

The absolute viscosity of the composition was measured by the viscometer of the model number PC-1TL manufactured by Malcom Co., Ltd. (10 rpm) at 25° C. in each example.

<Particle Size Measurement of Component (C)>

Each composition obtained above was sandwiched by two pieces of glass slide, where 30 particles were randomly selected from an image taken by VR-3000 manufactured by KEYENCE CORPORATION, the particle size of each particle was then measured, and an average value thereof was then calculated.

<Preparation of Cured Product>

Each composition obtained above was applied to the entire surface of an aluminum plate having a diameter of 1.26 mm and a thickness of 1 mm (referred to as "standard aluminum plate" hereunder), and another standard aluminum plate was further stacked thereon, followed by applying a pressure of about 175.5 kPa (1.80 kgf/$cm^2$) thereto to obtain a triple-layered structural body. Next, this triple-layered structural body was put into an electric furnace, where the temperature was raised to and then maintained at 50° C. for an hour to cure the composition. Later, the structural body was left to be cooled to room temperature, thereby obtaining a specimen for thermal resistance measurement.

The thickness of each specimen obtained was measured, where the thickness of each cured composition was calculated by subtracting therefrom the known thicknesses of the standard aluminum plates. Here, a micrometer (model; M820-25VA by Mitutoyo Corporation) was used to measure the thickness of each specimen. The thicknesses of the cured compositions are shown in Tables 1 and 2.

<Thermal Resistance Measurement>

Using each specimen, the thermal resistance ($mm^2$·K/W) of each cured composition was measured by a thermal resistance measurement device (model: LFA447 by NETZSCH Japan K.K.). The measurement results are shown in Tables 1 and 2.

<Void Test>

Here, 0.2 g of each composition was sandwiched by two pieces of glass slide each having a size of 5×7 cm, and they were then left at room temperature for 15 min with a 1 kg weight being placed thereon. Later, the weight was removed, and the test specimen was then left in an oven of 150° C. for an hour before being taken out therefrom. The cured product sandwiched between the glass slides was observed visually and by a microscope (model VR-3200 by KEYENCE CORPORATION).

[Evaluation]

Cracks were observed visually: ×

One or more circular voids (pores) with a diameter of 1.0 mm or larger were observed via the microscope: ×

Cracks and circular voids (pores) with a diameter of 1.0 mm or larger were not observed at all both visually and via the microscope: ○

<Thermal Conductivity Measurement>

The thermal conductivity of each specimen was measured by TPS-2500S manufactured by KYOTO ELECTRONICS MANUFACTURING CO., LTD. at 25° C.

<Particle Size Measurement of Component (D)>

The particle size of the thermally conductive filler is a cumulative average size on volumetric basis that is measured by Microtrac MT3300EX which is a particle size analyzer manufactured by Nikkiso Co., Ltd.

<Application to Semiconductor Device>

Here, 0.2 g of each composition obtained in working examples 1 to 6 was applied to the surface of a 2 cm×2 cm CPU to form a coating layer. A heat dissipation member was then stacked on this coating layer before curing the coating layer, thereby obtaining a semiconductor device with the CPU and heat dissipation member being bonded together via a thermally conductive layer having a thickness of 10 to 70 μm. As a result of installing each device into a host computer, a personal computer or the like and then operating the same, although the heat temperature of the CPU was about 100° C., a stable thermal conductance and heat dissipation were observed for a long period of time in the case of each device, thereby making it possible to prevent, for example, performance deterioration and breakage of the CPU which are caused by cumulative overheating. Thus, it was confirmed that a semiconductor device was able to have its reliability improved by employing the cured product of the composition of the present invention.

TABLE 1

| | | | Working example | | | | | |
|---|---|---|---|---|---|---|---|---|
| | | | 1 | 2 | 3 | 4 | 5 | 6 |
| Composition (part by mass) | (A) | A-1-1 | 40 | 60 | 70 | 70 | | 70 |
| | | A-1-2 | | | | | 50 | |
| | | A-2-1 | 60 | 40 | 30 | | 50 | |
| | | A-2-2 | | | | 30 | | 30 |
| | (B) | B-1 | 5.0 | 6.0 | | 4.7 | | 7.0 |
| | | B-2 | | | 7.5 | | 4.0 | |
| | SiH/Vi* | | 1.5 | 1.3 | 1.0 | 0.9 | 2.0 | 1.3 |
| | (C) | C-1 | 3500 | | | | | |
| | | C-2 | | 7000 | | | 7000 | |
| | | C-3 | | | 11000 | | | 12000 |
| | | C-4 | | | | 5000 | | |

TABLE 1-continued

| | | | Working example | | | | | |
|---|---|---|---|---|---|---|---|---|
| | | | 1 | 2 | 3 | 4 | 5 | 6 |
| | (D) | D-1 | 200 | 100 | | 50 | 50 | 70 |
| | | D-2 | 50 | | 50 | | 50 | |
| | (E) | E-1 | 0.3 | 0.3 | 0.5 | 0.3 | 0.3 | 0.5 |
| | (F) | F-1 | 0.3 | 0.3 | 0.3 | 0.3 | 0.3 | 0.3 |
| | (G) | G-1 | 50 | 80 | 200 | 80 | 80 | 300 |
| | | G-2 | | 20 | 50 | | 20 | 10 |
| | | G-3 | | | | 10 | | |
| Viscosity (Pa · s) | | | 70 | 110 | 120 | 80 | 170 | 210 |
| Particle size of component (C) (μm) | | | 50 | 30 | 60 | 80 | 35 | 20 |
| Thermal conductivity (W/mK) | | | 5.2 | 6.8 | 6.5 | 5.9 | 6.7 | 6.4 |
| Void test | | | ○ | ○ | ○ | ○ | ○ | ○ |
| Specimen thickness (μm) | | | 22 | 17 | 10 | 20 | 21 | 20 |
| Thermal resistance ($mm^2 \cdot K/W$) | | | 1.5 | 1.1 | 1.0 | 1.4 | 1.2 | 1.1 |

*The number of the silicon atom-bonded hydrogen atoms in the component (B) per 1 silicon atom-bonded alkenyl group in the component (A) is expressed as H/Vi for the sake of simplicity (the same applies hereafter).

TABLE 2

| | | | Comparative example | | | | |
|---|---|---|---|---|---|---|---|
| | | | 1 | 2 | 3 | 4 | 5 |
| Composition | (A) | A-1-1 | 100 | | 40 | 40 | 40 |
| (part | | A-1-2 | | | | | |
| by | | A-2-1 | | 100 | 60 | 60 | 60 |
| mass) | | A-2-2 | | | | | |
| | (B) | B-1 | 10 | 1.0 | 5.0 | 5.0 | 5.0 |
| | | B-2 | | | | | |
| | SiH/Vi* | | 1.4 | 1.5 | 1.5 | 1.5 | 1.5 |
| | (C) | C-1 | 3500 | | | | |
| | | C-2 | | 7000 | | | |
| | | C-3 | | | 100 | | |
| | | C-4 | | | | 25000 | |
| | | C-5 | | | | | 7000 |
| | (D) | D-1 | 200 | 100 | 200 | 200 | 100 |
| | | D-2 | 50 | | 50 | 50 | |
| | (E) | E-1 | 0.3 | 0.3 | 0.3 | 0.3 | 0.3 |
| | (F) | F-1 | 0.3 | 0.3 | 0.3 | 0.3 | 0.3 |
| | (G) | G-1 | 50 | 80 | 50 | 300 | 80 |
| | | G-2 | | 20 | | 50 | 20 |
| | | G-3 | | | | | |
| Viscosity (Pa · s) | | | 50 | 250 | 8 | Note) | Note) |
| Particle size of component (C) (μm) | | | 80 | 25 | 110 | — | — |
| Thermal conductivity (W/mK) | | | 5.1 | 6.8 | 0.5 | — | — |
| Void test | | | Cracks occurred X | Voids occurred X | ○ | — | — |
| Specimen thickness (μm) | | | 22 | 21 | 22 | — | — |
| Thermal resistance ($mm^2 \cdot K/W$) | | | 6.0 | 5.8 | 29 | — | — |

Note)
A grease-like uniform composition was unable to be obtained.

DESCRIPTION OF THE SYMBOLS

1 Curable composition layer (coating layer) (thermally conductive layer)
2 CPU (Central processing unit)
3 Substrate
4 Heat dissipation member
5 Adhesive agent

The invention claimed is:

1. A curable organopolysiloxane composition comprising:

(A) 100 parts by mass of an organopolysiloxane that is composed of the following (A-1) and (A-2), and in which a ratio of (A-1) to a sum of (A-1) and (A-2) is 10 to 90% by mass, (A-1) an organopolysiloxane that has at least two silicon atom-bonded alkenyl groups per molecule and has a linear structure, and has a viscosity of 0.01 to 10 Pa·s at 25° C., (A-2) an organopolysiloxane that has at least two silicon atom-bonded alkenyl groups per molecule and has a linear structure, and has a viscosity of 11 to 1,000 Pa·s at 25° C.;

(B) an organohydrogenpolysiloxane that has at least two silicon atom-bonded hydrogen atoms per molecule, and is in an amount at which the number of the silicon atom-bonded hydrogen atoms in the component (B) is 0.1 to 5.0 per 1 alkenyl group in the component (A);

(C) 300 to 20,000 parts by mass of at least one selected from the group consisting of gallium and gallium alloys that have melting points of −20 to 70° C.;

(D) 10 to 1,000 parts by mass of a thermally conductive filler having an average particle size of 0.1 to 100 μm;

(E) a platinum group metal catalyst that is in an amount of 0.1 to 500 ppm in terms of the mass of the platinum group metal with respect to the mass of the component (A); and (G-1) 10 to 500 parts by mass of an organopolysiloxane represented by the following general formula (1),

[Chemical formula 1]

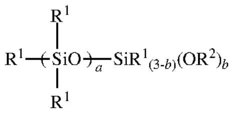

(1)

wherein $R^1$s represent identical or different alkyl groups, $R^2$ represents an alkyl group, a is an integer of 5 to 100, b is an integer of 1 to 3.

2. The curable organopolysiloxane composition according to claim 1, wherein the composition further comprises:

(G-2) an alkoxysilane compound that is represented by the following general formula (2), and is in an amount of 0.1 to 100 parts by mass per 100 parts by mass of the component (A), $$R^3_cR^4_dSi(OR^5)_{4-c-d} \quad (2)$$

wherein $R^3$ independently represents an alkyl group having 6 to 16 carbon atoms, $R^4$ independently represents a substituted or unsubstituted monovalent hydrocarbon group having 1 to 8 carbon atoms, $R^5$ independently represents an alkyl group having 1 to 6 carbon atoms, c is an integer of 1 to 3, d is an integer of 0 to 2, and a sum of c+d is an integer of 1 to 3.

3. The curable organopolysiloxane composition according to claim 1, wherein the composition further comprises:

(G-3) trifluoropropyltrimethoxysilane that is in an amount of 0.1 to 100 parts by mass per 100 parts by mass of the component (A).

4. The curable organopolysiloxane composition according to claim 1, wherein the component (B) is an organohydrogenpolysiloxane that has 5 or more silicon atom-bonded hydrogen atoms at non-terminal moieties of the molecular chain per molecule, and satisfies the flowing formula (3), $$0.1 < \alpha/\beta \quad (3)$$

wherein α represents the number of the hydrogen atoms bonded to the silicon atoms at the non-terminal moieties of the molecular chain; β represents the number of all the silicon atoms in the component (B).

5. The curable organopolysiloxane composition according to claim 1, wherein the component (C) is dispersed in the composition in the form of particles of a size of 1 to 200 μm.

6. A thermally conductive silicone grease composition comprising the curable organopolysiloxane composition according to claim 1.

7. A cured product of the curable organopolysiloxane composition according to claim 1.

8. A semiconductor device comprising:

a heat-generating electronic part;

a heat dissipation member; and a thermally conductive layer composed of the cured product according to claim 7, wherein the heat-generating electronic part and the heat dissipation member are bonded via the thermally conductive layer.

9. A method for producing the semiconductor device according to claim 8, comprising:

(a) a step of applying a curable organopolysiloxane composition to a surface of a heat-generating electronic part to form thereon a coating layer composed of the composition, wherein the curable organopolysiloxane composition comprises:

(A) 100 parts by mass of an organopolysiloxane that is composed of the following (A-1) and (A-2), and in which a ratio of (A-1) to a sum of (A-1) and (A-2) is 10 to 90% by mass, (A-1) an organopolysiloxane that has at least two silicon atom-bonded alkenyl groups per molecule, and has a viscosity of 0.01 to 10 Pa·s at 25° C., (A-2) an organopolysiloxane that has at least two silicon atom-bonded alkenyl groups per molecule, and has a viscosity of 11 to 1,000 Pa·s at 25° C.;

(B) an organohydrogenpolysiloxane that has at least two silicon atom-bonded hydrogen atoms per molecule, and is in an amount at which the number of the silicon atom-bonded hydrogen atoms in the component (B) is 0.1 to 5.0 per 1 alkenyl group in the component (A);

(C) 300 to 20,000 parts by mass of at least one selected from the group consisting of gallium and gallium alloys that have melting points of −20 to 70° C.;

(D) 10 to 1,000 parts by mass of a thermally conductive filler having an average particle size of 0.1 to 100 μm;

(E) a platinum group metal catalyst that is in an amount of 0.1 to 500 ppm in terms of the mass of the platinum group metal with respect to the mass of the component (A); and (G-1) 10 to 500 parts by mass of an organopolysiloxane represented by the following general formula (1),

[Chemical formula 1]

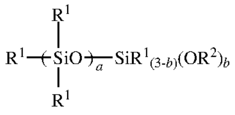

(1)

wherein $R^1$s represent identical or different alkyl groups, $R^2$ represents an alkyl group, a is an integer of 5 to 100, b is an integer of 1 to 3;

(b) a step of press-bonding and fixing a heat dissipation member to the coating layer; and (c) a step of heating a structural body obtained after the step (b) at 80 to 180° C. to cure and turn the coating layer into a thermally conductive layer.

* * * * *